May 8, 1956  G. C. BATZ  2,744,746
MACHINE FOR FORMING AND HEAT TREATING METAL ARTICLES
Filed June 17, 1952  7 Sheets-Sheet 1
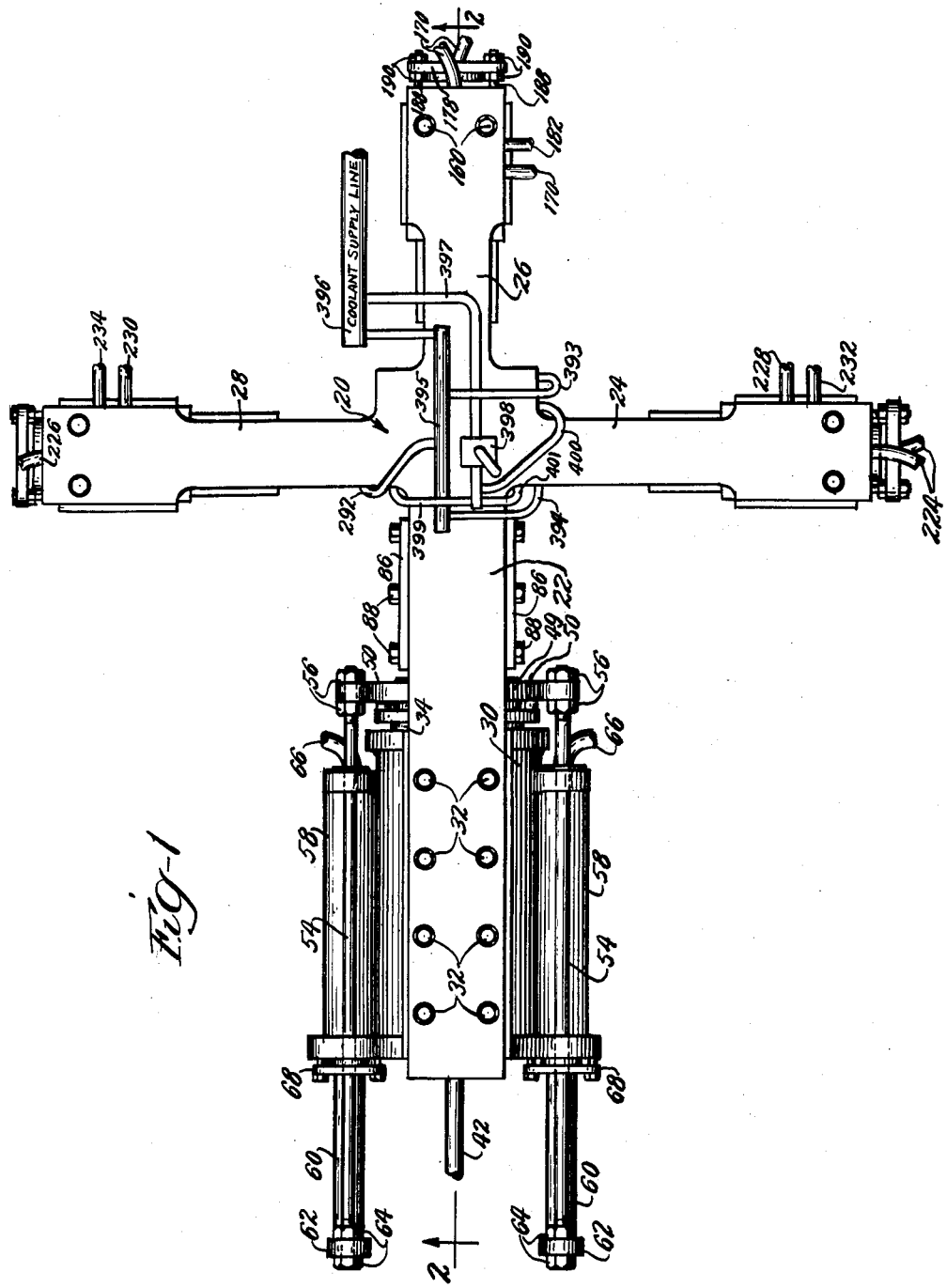
INVENTOR.
George C. Batz
BY
Mann, Brown and Hansmann
Attys.

May 8, 1956  G. C. BATZ  2,744,746
MACHINE FOR FORMING AND HEAT TREATING METAL ARTICLES
Filed June 17, 1952  7 Sheets-Sheet 2
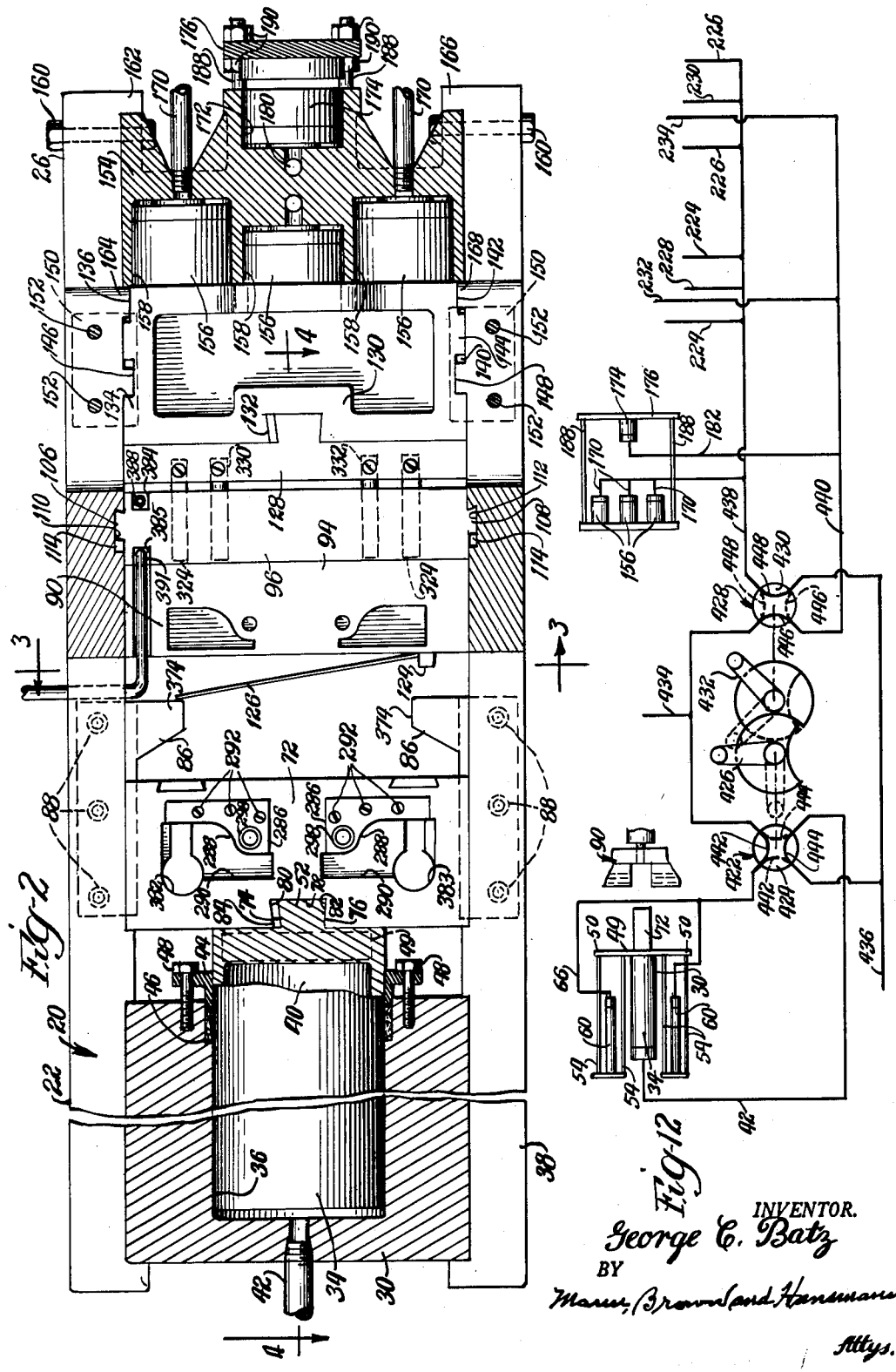
INVENTOR.
George C. Batz
BY
Mann, Brown and Hanemann
Attys.

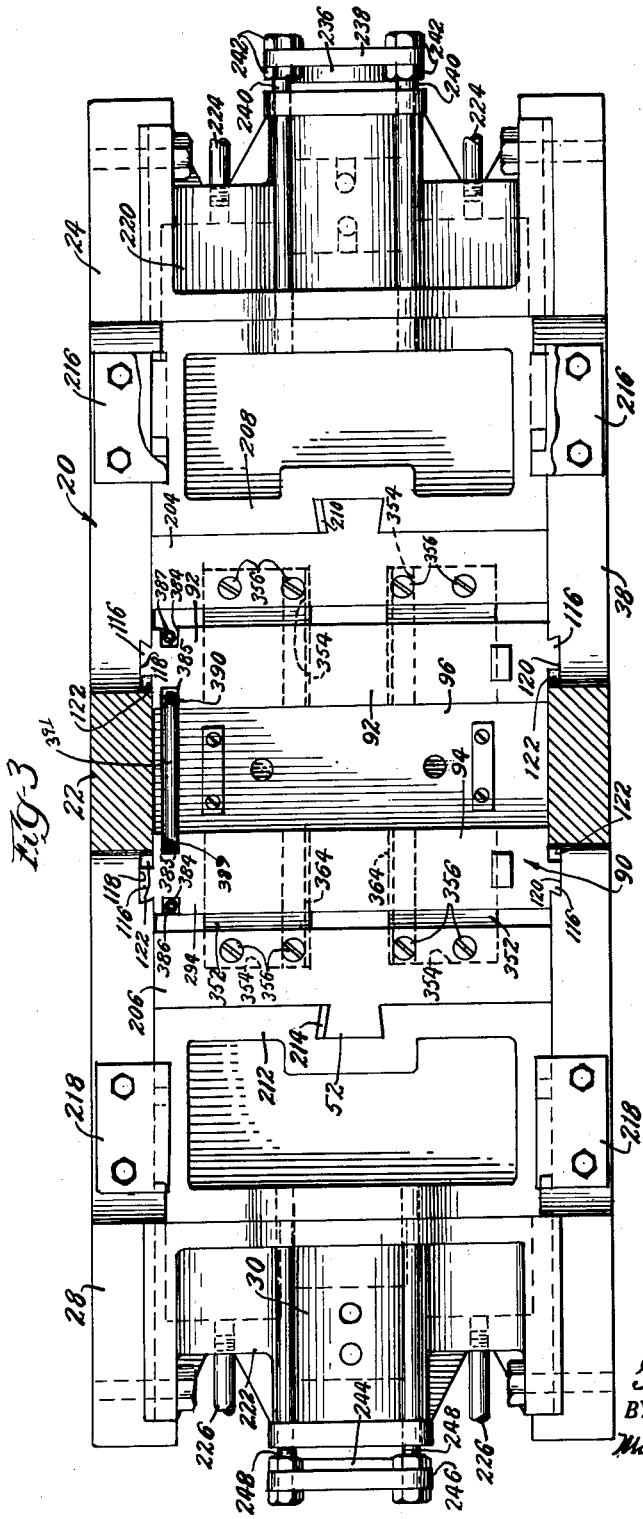

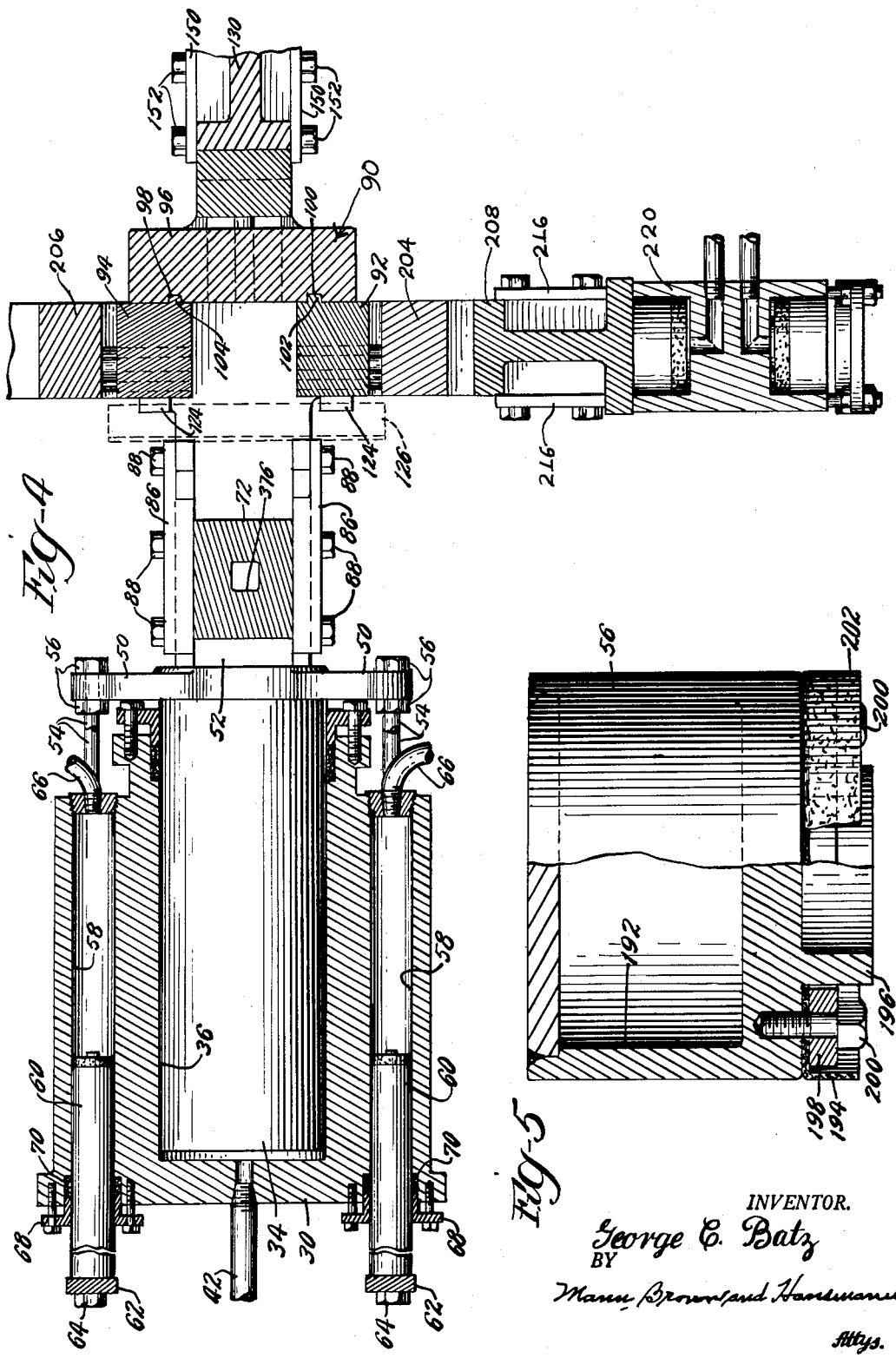

May 8, 1956  G. C. BATZ  2,744,746

MACHINE FOR FORMING AND HEAT TREATING METAL ARTICLES

Filed June 17, 1952  7 Sheets-Sheet 5

INVENTOR.
George C. Batz
BY
Marry Brown and Hausmann
Attys.

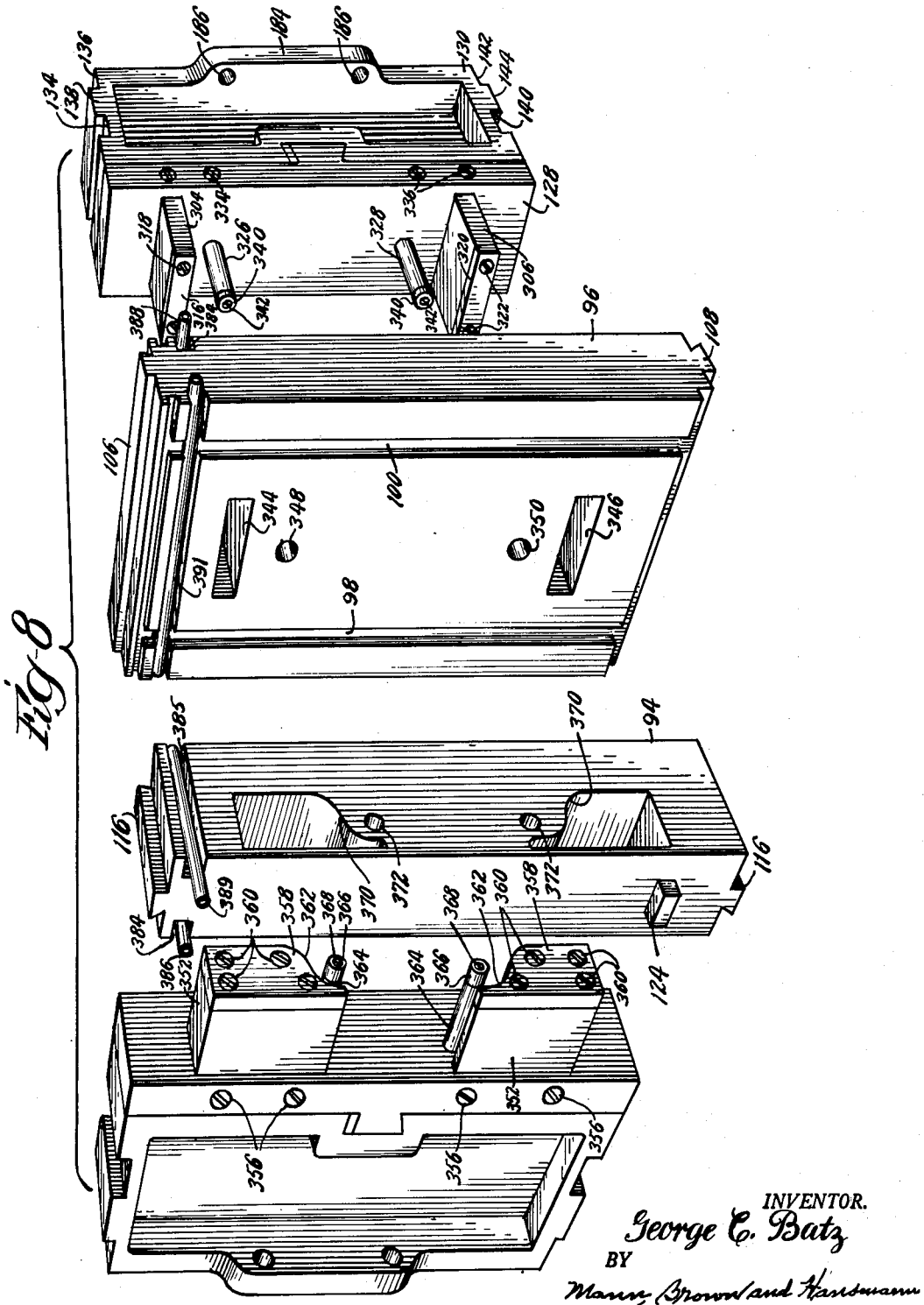

May 8, 1956  G. C. BATZ  2,744,746
MACHINE FOR FORMING AND HEAT TREATING METAL ARTICLES
Filed June 17, 1952  7 Sheets-Sheet 7
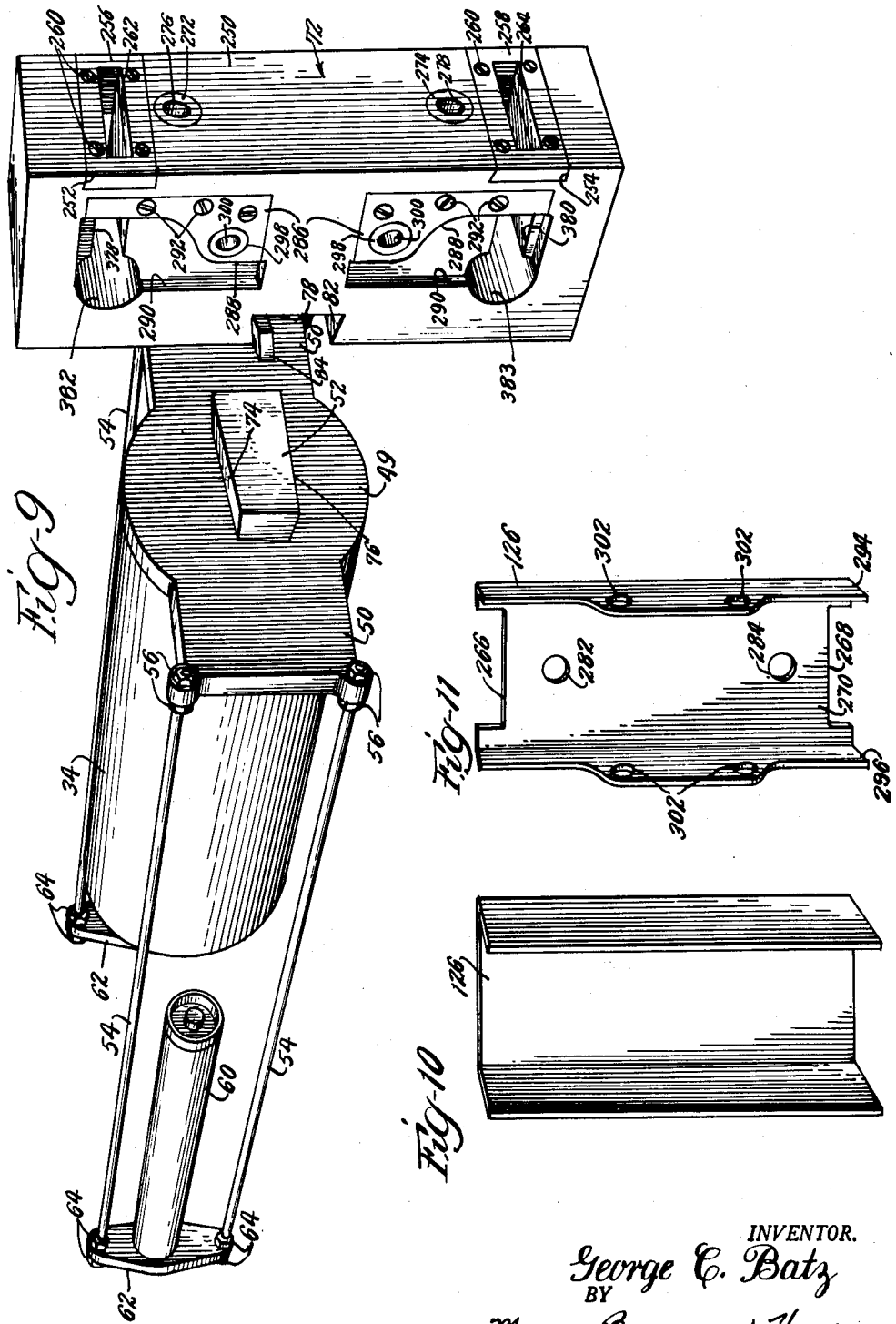
INVENTOR.
George C. Batz
BY
Mann, Brown and Hausmann
Attys.

2,744,746
Patented May 8, 1956

United States Patent Office

2,744,746

MACHINE FOR FORMING AND HEAT TREATING METAL ARTICLES

George C. Batz, Topeka, Kans.

Application June 17, 1952, Serial No. 294,106

12 Claims. (Cl. 266—6)

My invention relates to a machine for producing metal articles and is especially concerned with a machine which will form, punch, trim and heat-treat an article in one operation. Such a machine is particularly useful in, but not limited to, the fabrication of pedestal liners for railway car trucks.

Pedestal liners are disposed within a limited space between the side frames and journal boxes of the trucks and are subject to a great deal of frictional wear, due to relative movement between the journal boxes and side frames. Thus the liners should be precisely formed and hardened to resist wear. Pedestal liners have a U-shaped cross-section and must be formed, trimmed, punched and heat-treated.

In the past, parts of this type were produced in a number of steps performed on different machines, each having its own operator. One such method of producing the parts is to trim and punch a metal blank in one machine, form the blank in another machine and then heat-treat the article with other equipment. Another method is to punch and trim a heated blank in one machine, form the heated blank in another machine and then cool the part with other equipment for heat-treating. All of the methods heretofore used are characterized by requiring a plurality of machines and operations, and therefore several operators and a large floor space.

Various other disadvantages have also been encountered heretofore in forming such metal parts. When utilizing a plurality of machines, it is imperative that the pedestal liner must be accurately positioned in each machine, so that the finished parts will be uniform. For instance, if the forming machine accurately forms the part, but the stamping machine inaccurately positions the fastening holes, the part must be rejected. While the part may be trimmed, punched and formed in its cold state, cold forming and punching is disadvantageous, since weak points are frequently produced in the part as the metal is cold-drawn. When the blanks are heated before forming, trimming and punching, the danger in handling the blanks is appreciable since the heated blanks must be transferred from machine to machine by several operators. Such excessive handling necessarily cools the parts, while at the same time warming the atmosphere to an uncomfortable temperature, and thus the parts must be initially overheated so that they are sufficiently hot to be heat-treated after forming, trimming and punching. In rapidly cooling the part for heat-treating, special equipment must be used to prevent excessive shrinking. Metal parts formed with a plurality of sides each requiring trimming and punching necessitated the use of a large number of expensive male and female die members.

My invention avoids all of these difficulties as well as many others in the production of metal articles, and has for its objects the provision of a machine which is rugged, yet simple in construction; which forms, trims and punches articles in one operation; which trims, punches, forms and heat-treats metal articles in one operation; which is adapted to form a multisided article and simultaneously perform punching and trimming operations on the sides; which has a combined forming die and punching and trimming die; which has readily releasable dies; which has male and female forming dies that hold the workpiece in place while punching and trimming dies are in operation; which heat-treats the workpiece while disposed within the machine; which has forming dies that hold the workpiece against shrinkage during heat treatment; which has die blocks cooled by a circulating coolant to heat-treat the workpiece by quickly cooling the same; which has mechanisms for positively ejecting the finished article; which has chambers in a die block for conducting away the punching and trimming scraps; which is hydraulically operated; which maintains positive alignment between the punching, trimming and forming dies; which enables a hot blank to be formed, punched and trimmed in one operation; which eliminates unnecessary handling of the workpiece; which has forming dies cooled and cleaned by flushing fluid thereover; and which reduces the number and size of the die blocks to a minimum.

These and other objects and advantages will become more readily apparent as the description proceeds and is read in conjunction with the drawings, in which:

Fig. 1 is a plan view of the machine for producing metal articles;

Fig. 2 is a sectional view taken on line 2—2 of Fig. 1;

Fig. 3 is a sectional view taken on line 3—3 of Fig. 2;

Fig. 4 is a plan sectional view taken on line 4—4 of Fig. 2;

Fig. 5 is a detail view, with parts broken away, of a hydraulic piston;

Fig. 8 is an exploded view of part of the female forming die block, punch holders and filler blocks;

Fig. 9 is a perspective view of the main piston and main die head;

Fig. 10 is an isometric view of the workpiece after the traveling die has forced the workpiece into the female forming die block;

Fig. 11 is an isometric view of a completed pedestal liner; and

Fig. 12 is a schematic diagram of the hydraulic circuit for controlling my machine.

Figure 6:
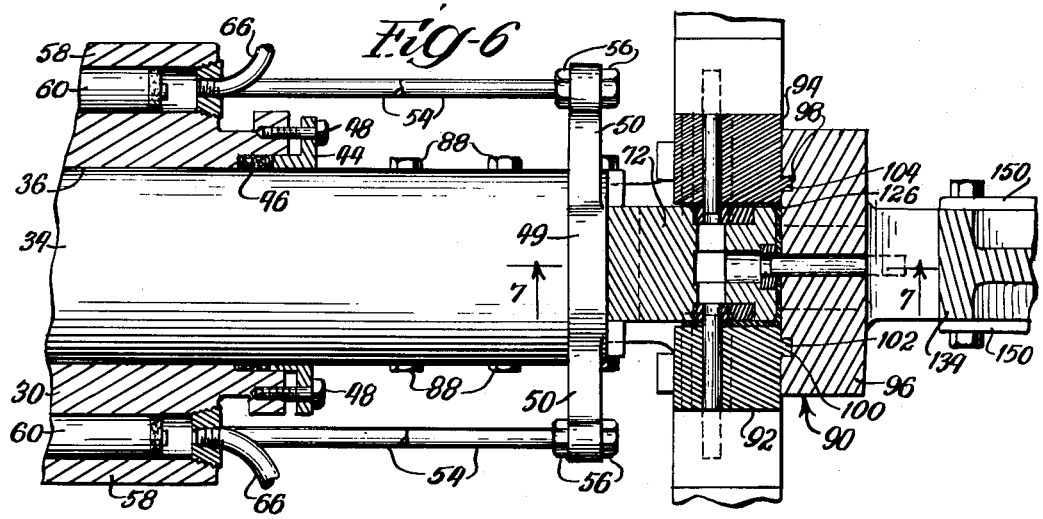
Fig. 6 is a plan view, partly in section, showing the traveling die in position within the female forming die block and taken on line 6—6 of Fig. 7.

Referring to Figs. 1 and 2, an upper main frame 20, having four quadrangularly disposed legs 22, 24, 26 and 28, has a main cylinder 30 secured thereto by bolts 32. A main piston 34 is disposed within a cylindrical bore 36 formed in main cylinders 30. A support frame 38 is arranged below main cylinder 30, and the cylinder is connected thereto in any convenient manner. The support frame 38 is fixedly secured, for example, to concrete machine mounts or legs.

Main piston 34 has a closed internal cavity 40 formed therein to make the piston lighter. A conduit 42 is connected into the rear end of main cylinder 30. Main piston 34 may be moved forwardly in cylinder 30 by introducing fluid under pressure through conduit 42 into bore 36. A fluid seal comprising a ring member 44 and packing 46 prevents escape of fluid between main cylinder 30 and main piston 34. Bolts 48, threaded into main cylinder 30 and extending through ring member 44, may be tightened to compress packing 46 between the main cylinder and piston.

A plate member 49, having a pair of oppositely-disposed flanges 50 and a keying block 52 (Figs. 2, 4 and 9), is welded on the forward end of main piston 34. A pair of rods 54 is secured to each flange 50 by means of nuts 56. Pullback cylinders 58, formed within extensions on main cylinder 30, are disposed between each pair of rods. Pullback pistons 60, mounted within each pullback cylinder, are connected to plates 62 and rods 54 are also connected to plates 62 at their rear end by means of nuts 64. The forward ends of pullback cylinders 58 communicate with a hydraulic circuit (hereinafter explained) by means of conduits 66. Sealing rings 68 and packing 70 are connected at the rear end of pullback cylinders 58 to prevent fluid from passing between the pullback pistons and cylinders. Thus, main piston 34 may be moved rearwardly by introducing high pressure fluid in the forward ends of pullback cylinders 58 to move pullback pistons 60 rearwardly and transmit this movement to main cylinder 34 through plates 62 and rods 54.

A main die head 72, best seen in Figs. 2 and 9, is secured to keying block 52. Keying block 52 is narrower at one end than at the other, and has two oppositely-disposed tapered faces 74 and 76. Main die head 72 is notched, as indicated at 78, and has two tapered faces 80 and 82 disposed substantially parallel to faces 74 and 76 of keying block 52. The faces 80 and 82 on main die head 72 are, however, spaced farther apart than faces 74 and 76 on keying block 52. Main die head 72 may be placed on keying block 52 by inserting the narrower end of the block into the wider end of notch 78 and then sliding main die head 72 longitudinally along block 52. A tapered key 84 is then driven into the opening between faces 74 and 80 to lock main head 72 on keying block 52. The main head may be readily removed by simply removing key 84 and sliding the head off block 52.

Figure 7:
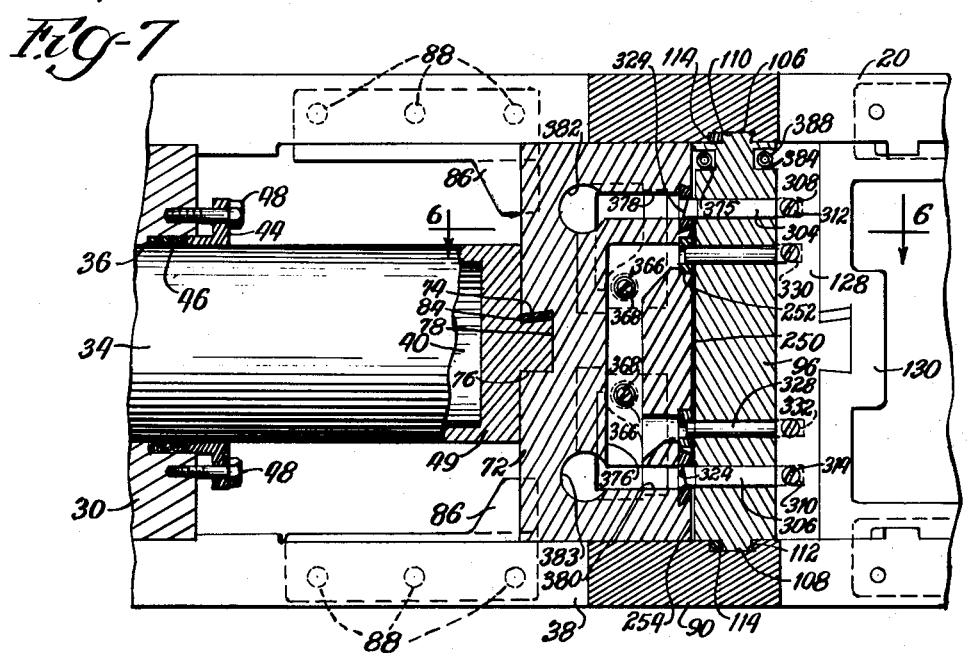
Fig. 7 is a sectional view taken on line 7—7 of Fig. 6.

The height of main die head 72 is such that the die head will slide between top main frame 20 and lower supporting frame 38 but without tilting relative to these frames. As best seen in Figs. 2, 4 and 7, guiding and stripping plates 86 are connected by bolts 88 to frames 20 and 38 adjacent the path of movement of main die head 72. One of these guiding and stripping plates is secured to each side edge of the top frame 20 and to each side edge of support frame 38. Hence, these plates engage the four corners of main die head 72. Thus, as main head 72 is moved between frames 20 and 38 parallel to guide plates 86, the plates will prevent sidewise tilting of head 72.

Main die head 72 serves as the male forming die member and is adapted to enter a female die block, generally designated 90 in Figs. 2, 3, 4, 6 and 7. Die block 90, which is disposed between frames 20 and 38 in the line of movement of main die head 72, is made up of two side blocks 92 and 94, and a backing block 96.

As seen in Figs. 4, 6 and 8, backing block 96 has formed therein spaced grooves 98 and 100. Side block 92 has a flange 102 adapted to seat within groove 100, and side block 94 has a flange 104 adopted to seat within groove 98.

In Figs. 2, 7 and 8, it will be seen that backing block 96 has a tapered flange 106, formed along its top edge and a tapered flange 108 formed along its lower edge. Top frame 20 has a groove 110 formed on the underface parallel to legs 24 and 28, and bottom frame 38 has a similar groove 112 formed in its upper face. Backing block 96 is positioned between frames 20 and 38, with flanges 106 and 108 disposed within grooves 110 and 112, respectively. Flanges 106 and 108 are narrower than grooves 110 and 112, and tapered keys 114 are driven into grooves 110 and 112 between frames 20 and 38 and flanges 106 and 108 to secure backing block 96 between the frames.

Referring to Figs. 3 and 8, it will be seen that side blocks 92 and 94 have flanges 116 similar to flanges 106 and 108 formed along the top and bottom edges. Legs 24 and 28 of top frame 20 have grooves 118 formed transversely there across, and bottom frame 38 has similar grooves 120. Side blocks 92 and 94 are mounted on frames 20 and 38 by sliding flanges 116 into grooves 118 and 120 and locked in place on the frames by tapered keys 122 driven between the frames and channels 116. Upon mounting side blocks 92 and 94 on frames 20 and 38, flanges 102 and 104 enter grooves 98 and 100 to secure side blocks 92 and 94 against movement relative to backing block 96. Thus, blocks 92, 94 and 96 are held together by frames 20 and 38 and flanges 102 and 104.

Die block 90 serves as the female forming die member and provides a U-shape chamber into which the traveling die head 72 may be moved upon extending main piston 34. In operation the workpiece is placed between traveling die head 72 and female die block 90 and formed around main die head 72 as the head is moved into the die block.

As seen in Figs. 2, 4 and 8, the side blocks 92 and 94 have offset portions 124 formed along the edge facing traveling die head 72. A blank workpiece 126 is placed across the open side of die block 90, with its lower end resting on portions 124 and its upper end resting against the guide and stripper plates 86. Thus, the workpiece assumes the tilted position shown in Figs. 2 and 4.

Upon supplying fluid to the rear end of main cylinder 36, main die head 72 will be moved forwardly into contact with workpiece 126, and carry the workpiece into female die block 90 to form the workpiece about main die head 72. After die head 72 has been fully inserted into female die block 90, the flat blank will have been formed into a U-shape, as shown in Figs. 6 and 10. This completes the forming of the workpiece.

Fig. 11 is a perspective view of the final form which the pedestal liners will assume, and it will be noted that various portions of the workpiece 126, shown in Fig. 10, have been removed. This is accomplished by trimming and punching the workpiece while it is disposed between blocks 92, 94, 96 and main die head 72. Various punch plates carried by main die head 72 and punches cooperate to perform the punching and trimming operation on the workpiece, as will be hereinafter explained.

Referring now to Figs. 2, 7 and 8, it will be seen that a punch holder 128 is disposed forwardly and adjacent backing block 96. This holder is keyed to a movable filler block 130 by a key 132 in a manner similar to the way in which main die head 72 is keyed to main piston 34. Punch holder 128 carries a plurality of punches, and both the punch holder and filler block are movable toward and away from backing block 96.

As seen in Figs. 2 and 8, filler block 130 has a pair of grooves 134 and 136 formed in the upper face and separated by a flange 138. Similar grooves 140 and 142, separated by a flange 144, are formed in the lower face of filler block. The top frame 20 has an offset portion 146, adapted to set within groove 134, and lower supporting frame 38 has an offset portion 148 adapted to set within groove 140. These offset portions on the frames serve to limit the movement of filler block 130 toward and away from backing block 96.

After punch holder 128 is in place between frames 20 and 38, filler block 130 may be slid into the space between the frames with offset portions 146 and 148 of the frames disposed within grooves 134 and 140, respectively, and keyed to holder 128 by key 132. Guide plates 150 are then secured to each edge of top frame 20 and supporting frame 38 by bolts 152. These plates 150 bear against filler block 130 along the four corners thereof, and guide the filler block in its movement toward and away from backing block 96.

A cylinder block 154, disposed forwardly and adjacent filler block 136, contains three feeding pistons 156 within cylinders 158. Cylinder block 154 is fixed to top frame 20 and support frame 38 by bolts 160 (Figs. 1 and 2). Top frame 20 has a flange 162 formed on its forward end, and a flange 164, spaced from the end flange, while supporting frame 38 has an end flange 166 and a spaced flange 168. Cylinder block 154 sets between flanges 162 and 164 on frame 20, and flanges 166 and 168 on frame 38.

The three cylinders 158 formed in cylinder block 154 are vertically aligned, and have their forward ends connected to a hydraulic circuit, by conduits 170, the two outside cyilnders having the conduits connected through the forward end of cylinder block 154 (Fig. 2), and the inner cylinder having the conduit 170 connected through the side of the cylinder block (Fig. 1). The rear faces of pistons 156 abut against filler block 130, and, hence, when high pressure hydraulic fluid flows into the forward end of cylinders 158, pistons 156 will be moved toward backing block 96 to force filler block 130 and punch holder 128 toward the backing block.

A pullback cylinder 172 is also formed in cylinder block 154 and contains a pullback piston 174. Piston 174 has a plate 176 secured thereto, as by welding, and the plate has two oppositely-extending wing portions 178 (Fig. 1). The pullback piston 174 extends through the forward end of pullback cylinder 172, and the rear end of the cylinder is connected to a hydraulic circuit through a bore 180 and conduit 182 (Figs. 1 and 2).

Filler block 130 is provided with outstanding portions 184 (Fig. 8) on each vertical side. Each outstanding portion 184 is provided with two bores 186, into which are secured pullback rods 188 (Figs. 1 and 2). The four pullback rods extend forward from filler block 130, and are connected to wing portions 178 of plate 176 by nuts 190 threaded onto the rods. Thus, when hydraulic fluid under pressure is admitted to the rear end of pullback cylinder 172, pullback piston 174 will be forced forwardly to move filler block 130 in the same direction through the connection affected by plate 176 and rods 188. Movement of filler block 130 away from backing block 96 will also move punch holder 128 and pistons 156 in the same direction, provided the forward ends of cylinders 158 are vented.

Pistons 156 and 174 have an interior chamber 192, as clearly shown in Fig. 5, and carry a sealing ring 194 secured on one face. Sealing ring 194 has an open center, is mounted over a boss 196 formed concentrically on the piston, and is held in place by a ring washer 198 and a plurality of bolts 200 threaded into the piston. An upstanding flange 202 on sealing ring 194 engages the cylinder wall and serves as a piston ring. Upon tightening bolts 200 to compress the sealing ring, flanges 202 will press more firmly against the cylinder wall.

Figs. 3, 4 and 6 show punch holders 204 and 206 arranged adjacent side blocks 92 and 94, respectively, of female die member 90. Punch holder 204 is disposed beneath leg 24 of top frame member 20, and punch holder 206 is disposed beneath leg 28. Punch holder 204 is keyed to a filler block 208 by a key 210, and punch holder 206 is keyed to another filler block 212 by a key 214. The structure to the right of punch holder 204 in Fig. 3 is identical to the structure to the left of punch holder 206, and both of these structures are similar to the structure to the right of punch holder 128 in Fig. 2, except that filler blocks 208 and 212 are somewhat larger than filler block 130. Filler blocks 208 and 212 are secured between legs 24 and 28 of the main frame 20 and support frame 38 in the same manner in which filler block 130 is secured between leg 26 of top frame 20 and support frame 38. Guide plates 216 are secured to each edge of leg 24 and to support frame 38 to guide filler block 208, while guide plates 218 are secured to each edge of leg 28 and to support frame 38 to guide filler block 212.

Cylinder blocks 220 and 222 (which are the same as cylinder block 154) are connected to leg 24 and leg 28, respectively, of top frame 20 and to support frame 38, in the same manner in which cylinder block 154 is connected between leg 26 and support frame 38. Conduits 224 are connected to the outer cylinders in cylinder block 220, and conduits 226 are connected to the outer cylinders in cylinder block 222. Conduits 228 and 230 are connected to the inner feeding cylinders of blocks 220 and 222, respectively (Fig. 1), and conduits 232 and 234 are connected to the pullback cylinders of cylinder blocks 220 and 222, respectively. Pullback piston 236 (Fig. 3), associated with cylinder block 220, is connected to a plate 238 having pullback rods 240 connected thereto by nuts 242 threaded on the rods. Rods 240 are connected to filler block 208 in the same manner as rods 188 are connected to filler block 130. Pullback cylinder 244, associated with cylinder block 222, is similarly connected to a plate 246, rods 248 and filler block 212. Thus, punch holders 206 and 204 may be moved toward and away from side blocks 92 and 94, respectively, in precisely the same manner as punch holder 128 is moved toward and away from backing block 96.

Referring again to Figs. 10 and 11, it will be noted that several differently shaped portions of the workpiece 126 must be punched out and trimmed away from the blank in order to produce the finished product. The punching and trimming or stamping plates and punch dies hereinafter described are of such size and construction to provide for trimming away and punching out the requisite portions of the blank. However, it must be understood that my invention is by no means limited to the particular trimming and punching plates and dies, since various types of plates and dies may be used to produce products of different configurations.

In Figs. 6, 7 and 9, it will be seen that main die head 72 is essentially a hollow body having various openings through the faces thereof. The front face 250 has spaced channels 252 and 254 formed thereacross into which trimming plates 256 and 258 are secured by means of screws 260 threaded into main die head 72. Trimming plates 256 and 258 have rectangular openings 262 and 264 formed therethrough to cooperate with punches carried on punch holder 128 to punch out the elongated notches 266 and 268, respectively, on the ends of web 270 of workpiece 126.

As best seen in Fig. 9, channels 252 and 254 have tapered sides, and trimming plates 256 and 258 have similar tapered side edges. Thus, plates 256 and 258 may be inserted in the channels by sliding the plates endwise into the channels and held therein by the tapered sides of the channeled and tapered edges of the plates. Screws 260 are then inserted to lock these plates within the channels.

Spaced die plates or punch dies 272 and 274, having open cylindrical centers 276 and 278, respectively, are inserted in front face 250 of main die head 72. These punch dies snugly fit within bores in the traveling die and need no special fastening means. The open cylindrical centers 276 and 278 communicate with the hollow interior of head 72, and are adapted to cooperate with cylindrical punches carried on punch holder 128 to punch cylindrical holes 282 and 284 (Fig. 11) in the web 270 of workpiece 126.

Referring to Figs. 2 and 9, it will be seen that a pair of trimming plates 286 is secured on each side face of the main die head 72. Trimming or stamping plates 286 have curvilinear cutting edges 288 disposed adjacent cavities 290 formed into the side faces of head 72 and are recessed within head 72, with the outside faces of stamping plates flush with the side faces of head 72. The plates are secured to traveling head 72 by screws 292.

Plates 286 cooperate with punches carried by punch holders 204 and 206 to trim the free corners of flanges 294 and 296 of workpiece 126 (Fig. 11). Each plate is provided with a punch die 298 fitted therein. These dies have a cylindrical open center 300 communicating with the hollow interior of main forming die head 72 and cooperating with punches carried by punch holders 204 and 206 to form fastening holes 302 in the flanges 294 and 296 of workpiece 126.

As best seen in Figs. 2, 7 and 8, work holder 128 carries spaced rectangular shaped punches 304 and 306, secured within channels 308 and 310 by screws 312 and 314 threaded transversely through holder 128 into channels 308 and 310, respectively. Punch 304 has a cutting tip 316 secured on the rear face by screws 318, while punch 306 carries a similar cutting tip 320 fastened by screws 322. The exposed faces of the cutting tips 316 and 320 are tapered to provide sharp leading edges 324 (Figs. 2 and 7). Also, cylindrical punches 326 and 328 are fastened within bores 330 and 332 of punch holder 128 by screws 334 and 336. Cylindrical punches 326 and 328 each carry a hardened tip 340 secured thereto by screws 342.

Backing block 96 is provided with rectangular openings 344 and 346 through which punches 304 and 306 may slide, and cylindrical bores 348 and 350 through which punches 326 and 328 may slide. When pistons 156 of cylinder block 154 are in their retracted position, as shown in Fig. 2, the tips 316, 320 and 340 of these punches are disposed within the openings in backing block 96. After traveling die head 72 has been forced into die block 90 to form the workpiece into its U-shape, pistons 156 may then be extended to move work holder 128 toward backing block 96 until punches 304, 306, 326 and 328 penetrate the web of the workpiece and shear away portions of the workpiece to form elongated notches 266 and 268, and fastening holes 282 and 284. The shearing action will take place between hardened tips 316, 320 and 340 of the punches, and plates 256, 258, 272 and 274 carried by traveling head 72.

Referring to Figs. 3 and 8, a pair of punches 352 is secured within channels 354 of punch holders 204 and 206 by screws 356 threaded transversely through these punch holders. Cutting plates or tips 358 are secured to the leading edges of punches 352 by screws 360, and have a curvilinear shearing edge 362. Cylindrical punches 364 are also secured to punch holders 204 and 206 and carry hardened tips 366 secured thereto by screws 368.

Side blocks 92 and 94 are provided with openings 370 and 372 similar in configuration to punches 352 and 364. Openings 370 receive punches 352, while openings 372 receive punches 364. When the feeding pistons of cylinder blocks 220 and 222 are in their retracted positions, the tips 362 and 366 of punches 352 and 364 are disposed within side blocks 92 and 94. When the feeding pistons in cylinder blocks 220 and 222 are extended, punches 352 and 364 will pierce the workpiece and enter traveling head 72, as seen in Fig. 6, to shear away portions of the workpiece to form fastening holes 302 and the free corners of flanges 294 and 296 of the workpiece. The flanges of the workpiece will be sheared between curvilinear edges 362 of punches 352 and curvilinear edges 288 of trimming plates 286, and between tips 366 of punches 364 and punch dies 298.

Cutting tips 316, 320, 340 and 366, plates 256, 258, 272, 274, 286 and 358 and punch dies 298 serve to shear away the various portions of the workpiece. Hence, these parts must be sufficiently hard so that their cutting edges will not be rapidly dulled. I have found that using tool steel having a hardness rating of Brinell 555–577 permits extensive shearing without excessive dulling of the tips, plates and punch dies.

After main head 72 has been moved into die block 90 to form the workpiece into a U-shape, and the punches have been operated, the finished workpiece is tightly wrapped around the main die head. With the punches in retracted positions, the main die head 72 is then withdrawn from die block 90 and carries the finished workpiece out of the die block. The forward edges of offset portions 374 of guiding and stripping plates 86 engage the free edges of the flanges 294 and 296 of workpiece 126, and strip the workpiece from the traveling head 72, as the traveling head moves rearwardly between the stripping plates. The workpiece may then be removed from between traveling head 72 and die block 90 and another blank inserted.

As previously mentioned, traveling main die head 72 is hollow, and the various passages into which punches 326, 328 and 364 are received are in communication with a vertically disposed chamber 376 (Fig. 7). Rectangular shaped punches 304 and 306 enter passages 378 and 380, respectively, which passages communicate with transverse bores 382 and 383 formed through head 72. Transverse bore 383 is also in communication with vertical bore 376. As hereinbefore pointed out, recesses 290 are formed in head 372 adjacent trimming plates 286.

Thus, when punches 326, 328 and 364 shear circular plugs from workpiece 126, these plugs enter and fall through vertical bore 376 into transverse bore 383, and when rectangular punches 304 and 306 shear rectangular strips from the workpiece, these strips will move into transverse bores 382 and 383. As the free corners of the flanges 294 and 296 of the workpiece are sheared away by punches 352, the sheared-off portions are forced into chambers 290 formed in the sides of head 72. Thus, all of the pieces sheared away from workpiece are collected within traveling die head 72.

The continual movement of traveling head 72 will, in most cases, sufficiently jar the head to permit the cylindrical plugs formed by punches 326, 328 and 364, and the rectangular pieces sheared by punch 306, to fall from one end or the other of transverse bore 383 and also cause the rectangular pieces punched out by punch 304 to fall from one end or the other of transverse bore 382. The normal movement of head 72 will also cause the waste pieces punched from the free corners of the flanges of the workpiece, and disposed within chamber 290 of the main head, to fall out of these chambers when the main head is retracted from die block 90. However, if the movement of the main head does not cause the waste pieces to fall therefrom, rods may be pushed through transverse bores 382 and 383 to clear the same of all waste pieces when main head 72 is retracted.

One of the important features of my invention is that the workpiece is heat-treated simultaneously with the forming, trimming and punching operations, while the workpiece remains within the forming dies. This is accomplished by circulating a coolant over side blocks 92 and 94, backing block 96, and main die head 72.

Side blocks 92 and 94 and backing block 96 of die block 90 have channels 384 formed horizontally across their outside faces, and have channels 385 formed across their working faces. A pipe 386 is welded into channel 384 of side block 94, and a pipe 387 is welded within channel 384 of side block 92. Pipes 386 and 387 extend beyond the edges of blocks 92 and 94 which face the main piston. A pipe 388 is welded within channel 384 on the rear face of backing block 96 and extends beyond the right hand side of backing block, as viewed in Fig. 8.

Pipes 389, 390 and 391 are welded within channels 385 of side block 94, side block 92 and backing block 96, respectively. These pipes extend beyond the edges of blocks 92, 94 and 96 in the same manner as pipes 386, 387 and 388.

Pipes 386 through 391 have a diameter less than the width of channels 384 or 385, and are secured to the top of these channels so that a space is provided between the lower side of the channels and the pipes. The pipes are also closed at their ends which do not extend beyond the edges of the blocks, and are provided with a plurality of small openings formed through the inner sides of the pipes. As will be hereinafter explained, when a coolant is supplied to these pipes, the coolant will spray from the small openings against the bottoms of the channels, pass between the pipes and the lower sides of the channels, and then run down the faces of the die blocks.

Referring to Fig. 1, it will be seen that conduits 392, 393 and 394 are connected between a supply pipe 395 and pipes 386, 388 and 387, respectively. Supply pipe 395 is connected to a coolant supply line 396. A second supply line 397 is connected between coolant supply line 396 and one side of a valve 398. Conduits 399, 400 and 401 are connected between the other side of the valve 398 and pipes 389, 391 and 390, respectively. Thus pipes 386, 387 and 388, disposed along the back faces of the die blocks, are continuously connected to the coolant supply line 396, while pipes 389, 390 and 391 are connected to coolant supply line 396 only when valve 398 is open.

In ordinary operation water will be continuously circulated over the back faces of die blocks 92, 94 and 96, and intermittently circulated across the faces of main die head 72 and die blocks 92, 94 and 96. The workpiece will have heat retracted therefrom by intimately contacting the cooled die blocks and traveling die head when the workpiece is wedged between the main die head and die block.

It is well recognized that steel may be hardened by rapidly extracting heat therefrom, and my invention readily provides for removing the heat. For example, the metal blank placed within my machine may be at a temperature of 1525° F. and quickly cooled to 900° F. This rapid cooling produces a finished workpiece having the hardness of 415 to 444 Brinell to 42 to 46 Rockwell.

Rapidly cooling the workpiece while wedged between main die head 72 and die block 90 prevents any twisting or shrinking of the workpiece, and thereby causes the workpieces to be uniform. Also, rapidly cooling the workpiece by means of the cool faces of main head 72, side blocks 92 and 94, and backing block 96, which are in contact with the workpiece, insures even cooling of the workpiece over its entire surface, since the workpiece is firmly held against the head and blocks.

Fig. 12 shows a schematic diagram of a hydraulic circuit for controlling the operation of my machine. A first valve, designated 422, controls the movement of main die head 72, and has a rotatable cylinder 424 operated by a handle 426. A second valve, designated 428, controls the movement of punch holders 128, 204 and 206, and has a rotatable cylinder 430 operated by a handle 432. A supply line 434, containing high pressure hydraulic fluid, and a discharge line 436 are connected to valves 422 and 428. The three feeding cylinders of each cylinder block 154, 220 and 222 are connected to a conduit 438 associated with valve 428, and the pullback cylinders of cylinder blocks 154, 220 and 222 are connected to a conduit 440 associated with valve 428. Conduit 42 of main cylinder 30 and conduits 66 associated with pullback cylinders 58 are connected to valve 422.

When piston 424 of valve 422 is in the position shown in solid lines, supply line 434 is connected to conduit 66 through an arcuate passage 442 in piston 424, and discharge line 436 is connected to conduit 42 of main cylinder 30 through an arcuate passage 444 of piston 424. Thus, high pressure fluid will enter the forward ends of pullback cylinders 58 to move main die head 72 away from die block 90, since the rear end of main cylinder 30 is vented to the discharge line. When handle 426 is rotated to the position shown in broken lines, piston 424 will also be rotated until arcuate passages 442 and 444 assume the positions shown in dotted lines. At this time, the conduits 66 of pullback cylinders 58 will be vented to discharge line 436 through passage 442, and supply line 434 will be connected to the rear end of main cylinder 30 through arcuate passage 444. This causes main die head 72 to be moved toward and into die block 90.

When valve 428 is in the position shown in solid lines, an arcuate passage 446 through piston 430 connects supply line 434 to the pullback cylinders in cylinder blocks 154, 220 and 222, and arcuate passage 448 vents the feeding cylinders of cylinder blocks 154, 220 and 222 to discharge line 436. By moving handle 432 to the position shown in dotted lines, piston 430 will be rotated and arcuate passage 446 will vent the pullback cylinders of the cylinder blocks to discharge line 436, and arcuate passage 448 will connect supply line 434 to the feeding cylinders of the cylinder blocks. Thus, the punches carried by punch holders 128, 204 and 206 may be forced through the workpiece by moving control arm 432 to the position shown in dotted lines, and the punches may be withdrawn by moving the control arm to the position shown in solid lines.

The hydraulic circuit of Fig. 12 is merely illustrative, and it should be realized that various modifications may be made. For example, it may be desirable to connect one of the feeding cylinders of each cylinder block to one source of pressure to rapidly move the punches against the workpiece and then connect the other feeding cylinders or all of the feeding cylinders to another source of pressure to provide a powerful force for forcing the punches through the workpiece. Also, the valves 422 and 428 could be readily controlled by a single handle.

In operating my machine to produce a pedestal liner, such as that shown in Fig. 11, a rectangular blank, heated to 1525° F., is placed on offset portions 124 of side blocks 92 and 94 and against portions 374 of guiding and stripping plates 86. Handle 426 of valve 422 is moved to the position shown in dotted lines to vent pullback cylinders 58 and connect main cylinder 30 with supply line 434. This moves main die head 72 and the blank into die block 90, while forming the blank tightly around the main die head. When the main die head has fully entered die block 90, the blank will have assumed the shape shown in Fig. 10.

Handle 432 of valve 428 is moved to the position shown in dotted lines in Fig. 12 to vent the pullback cylinders in cylinder block 154, 220 and 222, and connect the feeding cylinders of the cylinder blocks to supply line 434. This moves punch holder 128 toward backing block 96 to force punches 304, 306, 326 and 328 through web 270 of the workpiece to trim away elongated notches 266 and 268 and punch cylindrical holes 282 and 284. Punch holders 204 and 206 are simultaneously moved to force punches 252 and 364 through flanges 294 and 296 of the workpiece to trim away the free corners of these flanges and punch fastening holes 302. The parts cut away from the workpiece by these punches will enter the hollow interior of main head 72.

Control handle 432 of valve 428 is then moved to the position shown in solid lines of Fig. 12 to vent the feeding cylinders of cylinder blocks 154, 220 and 222, and connect the pullback cylinders of these cylinder blocks with supply line 434. Hence, punch holders 128, 204 and 206 will be moved away from die block 90 until the cutting tips of the various punches are disposed within the side blocks and backing block of die block 90.

Handle 426 of valve 422 is moved from the feeding position shown in dotted lines to the retracting position shown in solid lines. Upon such movement, main cylinder 30 is vented and pullback cylinders 58 are connected to supply line 434 to move main piston 34, and, consequently, main die head 72 moves away from die block 90. The finished workpiece, being tightly wrapped around the main die head due to having the workpiece formed around the die head and punched in this position, will be withdrawn from die block 90. As the main die head moves rearwardly between guiding and stripping plates 86, offset portions 374 of these plates will engage the free edges of flanges 294 and 296 of the workpiece. Continued movement of the main die head will strip the workpiece from the head and permit its removal from the machine.

After main die head 72 is removed from die block 90, the scrap pieces punched and trimmed away from the workpiece and remaining within the die head are free to fall from the head. Any scrap pieces which fail to fall freely from the die head may be removed by inserting a rod or ram through transverse bores 382 and 383 of the die head. Several parts may be formed, however, before it is necessary to remove scraps from the die head, since the chambers and cavities formed therein are sufficiently large to retain a plurality of scrap parts.

Throughout the entire operation of the machine, water or any other suitable coolant is circulated over the back faces of side blocks 92 and 94, and backing block 96 by means of pipes 386, 387, and 388. Thus, as soon as head 72 enters die block 90 and forms the blank into its U-shape, all parts of the workpiece are in intimate contact with the cool die blocks and are thereby rapidly cooled. Shrinking and twisting of the workpiece is prohibited during the rapid cooling, since the workpiece is tightly wrapped around the main die head and disposed within die block 90.

After the workpiece has been stripped from main die head 72 and removed from the machine, the main die head is reinserted in die block 90 without the interposition of a blank. Valve 398 is then opened to cause a coolant to flow from pipes 388, 390 and 391 down the working faces of main die head 72, side blocks 92 and 94, and backing block 96. As the coolant flows over these working faces the traveling die and die block are cooled, and any scale or other foreign substance is washed therefrom. After a short interval valve 398 may again be closed and the traveling die removed from die block 90. The machine is then in condition for the insertion of another heated blank, and a repetition of the described sequence of operation.

A pan or basin (not shown in the drawings) is provided on the support for the machine. When a disposable coolant, such as water, is used, the pan or basin may be connected with the drain; but when oil or any other relatively expensive coolant is used the pan will form a part of a closed circuit.

In the preceding description it will be noted that the traveling die 72 was initially cooled by moving the traveling die into die block 90, and circulating a coolant between the dies by opening valve 398. This method of cooling the main die head provides the advantage of having the die member cleaned as well as cooled. However, it should be appreciated that a coolant could be circulated over or through the main die head by providing fittings thereon.

Since both main die head 72 and die block 90 are cooled the workpiece will be in intimate contact with a cold surface at all faces. This provides uniform heat treating, thereby eliminating hard and soft spots on the workpiece. The degree of hardness of the finished workpiece may be widely varied in my machine by simply increasing or decreasing the amount of time during which the workpiece is held between the traveling die and die block. It should be appreciated that if it is desired to produce a large number of parts having the same hardness rating, the hydraulic controls of the machine may be operated by an appropriate timing mechanism. However, for the average part the appropriate time intervals may be estimated by the operator.

The results that have been achieved with my machine clearly demonstrate its superiority. For example, utilizing a blank of spring steel, ¼" x 17" x 17¾", heated to 1525° F., the entire cycle of operation, including inserting the blank, forming, trimming, punching, heat-treating, stripping and clearing the die of scrap pieces, requires only a minute and a half. This includes cooling the workpiece to about 900° F. to produce a finished part having a hardness of from 415 to 444 Brinell.

Having described my invention in detail, it should be evident that I have provided a new and novel machine for producing quality metal articles that will in one operation form, trim, punch and heat-treat the workpiece, while holding equipment and labor costs to a minimum.

While specific mechanisms have been described for performing specific operations in my machine, it should be realized that the invention is not limited to the particular mechanisms described, but may assume numerous other forms. Therefore, my invention includes all modifications, variations and alternatives coming within the scope of the appended claims.

I claim:

1. In a machine for producing multi-sided metal articles, forming dies for completely forming a part, said dies having a plurality of working faces angularly disposed from each other, and punches operating along individual paths of movement correspondingly angularly disposed from each other to move through the faces of said forming dies to shear away portions of the part from the various sides.

2. In a machine for producing multi-sided metal articles, forming dies for completely forming a heated part, said dies having a plurality of working faces angularly disposed from each other, punches operating along individual paths of movement correspondingly angularly disposed from each other to move through the faces of said forming dies to shear away portions of the parts from the various sides, and means to circulate a coolant in contact with the dies to heat-treat the part.

3. In a machine for producing metal articles from blanks, a combined forming and shearing traveling die member, a stationary die block having a plurality of working faces angularly disposed from each other adapted to receive said die member and a blank and form the blank about said die member, punches movable along individual paths of movement correspondingly angularly disposed from each other to move through said die block into shearing relationship with said die member to shear away portions of said blank, and control means to move said die member into said die block and move said punches into shearing relationship.

4. In a machine for producing metal articles from heated blanks, a combined forming and shearing traveling die member, a stationary die block having a plurality of working faces angularly disposed from each other adapted to receive said die member and a blank and form the blank about said die member, punches movable along individual paths of movement correspondingly angularly disposed from each other to move through said die block into shearing relationship with said die member to shear away portions of said blank, control means to move said die member into said die block and move said punches into shearing relationship, and means to circulate a coolant in contact with said die block to harden said blanks by quick cooling.

5. In a machine for producing metal articles from blanks, a combined forming and shearing traveling die member having chambers formed therein, a stationary die block having a plurality of working faces angularly disposed from each other adapted to receive said die member and blank to form the blank about said die member, and punches movable along individual paths of movement correspondingly angularly disposed from each other to move through said die block into shearing relationship with said die member to shear off portions of the blank and deposit these portions within the chambers formed in the die member.

6. In a machine for producing a metal article from a blank, a frame, a stationary forming die block having a plurality of working faces angularly disposed from each other and being mounted on said frame, a traveling forming die member having chambers formed therein, shearing plates secured on said die member and having shearing edges disposed adjacent the chambers formed in said die member, means to move said die member and the blank into said die block to form the blank about said die member, and punches movably mounted on said frame and movable along individual paths of movement correspondingly angularly disposed from each other to move through said die block toward said shearing plates to shear away portions of said blank and move the portions into said die member.

7. In a machine for producing a metal article from a blank, a frame, a movable forming die, a die member comprising side and backing blocks having openings therethrough extending in directions angularly disposed from each other, means to releasably secure said blocks to said frame, means to move said forming die into said die member to form the blank about said forming die, punches disposed within the openings in said blocks and movable in directions correspondingly disposed from each other, and means to move said punches through said blocks against the blank to shear away portions thereof.

8. In a machine for producing metal articles from blanks, a frame, forming dies mounted on said frame and adapted to shape a blank, cylinder blocks fixed to said frame, feeding and retracting pistons within said cylinder blocks, filler blocks slidably mounted between spaced portions of said frame and operatively connected to said pistons for movement therewith, punch holders releasably secured to said filler blocks, punches carried by said holders, a hydraulic circuit, and control means in said circuit to operate said feeder pistons to move the punches into shearing relationship with a blank held within said forming dies and to operate said retracting pistons to move said punches out of shearing relationship.

9. In a machine for producing a metal article from a blank, a frame, a die block secured to said frame, a traveling die slidably mounted on said frame, a plurality of punch holders each slidably mounted relatively to said frame and movable along a given path, the paths of movement of said holders being angularly disposed one from another, punches carried by said holders, and means to move said traveling die and blank into said die block to form the blanks and move said punch holders into shearing relationship with the blank while the blank is within said die block.

10. In a machine for producing metal articles from heated blanks, a frame, a cylinder member, main and pullback pistons disposed within said cylinder member, a traveling die releasably secured to said main and pullback pistons, shearing plates secured to said traveling die, said traveling die having openings disposed adjacent said shearing plates, a die block secured to said frame and having openings therein, punch holders movably mounted on said frame, punches carried by said punch holders and disposed within the openings in said die block, cylinder blocks secured to said frame, feeding and retracting pistons disposed within said cylinder blocks and operatively connected to said punch holders, a hydraulic circuit, control means in said circuit to operate said main piston and move and hold said traveling die and a blank within said die block, to operate said feeding pistons and move said punches into shearing relationship with said blank and shearing plates, to operate said retracting pistons and move said punches out of shearing relationship, and to operate said pull back piston to withdraw said traveling die and blank from said die block, means to strip the formed blank from said traveling die as the traveling die is withdrawn from said die block, and means to circulate a coolant in contact with said die block to cool the heated blanks.

11. In a machine for producing a metal article from a heated blank, a frame, a cylinder member, main and pull back pistons disposed within said cylinder member, a traveling die releasably secured to said main and pullback pistons and slidably mounted relatively to said frame, shearing plates secured to said traveling die, said traveling die having openings disposed adjacent said shearing plates, a female die block having working faces and back faces secured to said frame, said faces in said female die having channels and openings formed therein, punch holders movably mounted on said frame, punches carried by said punch holders and disposed within the openings in said die block, cylinder blocks secured to said frame, feeding and retracting pistons disposed within said cylinder blocks and operatively connected to said punch holders, pipes disposed in said channels of said die block, means to circulate a coolant through said pipes, coolant control means whereby coolant is continuously supplied to the pipes disposed in the channels in the back faces of said die block but is supplied to the pipes disposed in the channels in the front faces of said die block only when the traveling die and female die block are in nested relationship without the interposition of a heated blank, a hydraulic circuit, control means in said circuit to operate said main piston and move and hold said traveling die within said die block, to operate said pull back piston to withdraw said cooled traveling die from said cooled die block, to again operate said main piston and move and hold said cooled traveling die and a heated blank within said cooled die block, to operate said feeding pistons and move said punches into shearing relationship with said blank and shearing plates, to operate said retracting pistons and move said punches out of shearing relationship, and to operate said pullback piston to withdraw said traveling die and blank from said die block, and means to strip the formed blank from said traveling die as the traveling die is withdrawn from said die block.

12. In a machine for producing a metal article from a heated blank, a traveling die having working faces, a stationary female die having working faces and back faces, all of said faces being in substantially vertical planes, said faces in said female die having horizontal channels formed therein adjacent their upper ends, said dies being movable horizontally into operative engagement to wedge said blank between said dies, punches operating through the faces of said female die to shear away portions of the blank, pipes having spaced outlets disposed in said channels of said female die, and means to circulate a coolant through said pipes such that the coolant passes through said outlets and runs down the die faces for cooling the same.

References Cited in the file of this patent
UNITED STATES PATENTS

| Number | Name | Date |
|---|---|---|
| 1,018,676 | Mulvey | Feb. 27, 1912 |
| 1,204,096 | Waller | Nov. 7, 1916 |
| 1,316,211 | Wegner | Sept. 16, 1919 |
| 1,418,986 | Stock | June 6, 1922 |
| 1,432,073 | Lowy | Oct. 17, 1922 |
| 1,457,772 | Forsyth | June 5, 1923 |
| 1,560,745 | Walker | Nov. 10, 1925 |
| 1,746,043 | Maguire | Feb. 4, 1930 |
| 1,932,376 | Nyberg | Oct. 24, 1933 |
| 2,261,793 | Broomham | Nov. 4, 1941 |
| 2,277,339 | Luginbill et al. | Mar. 24, 1942 |
| 2,321,085 | Hubbard | June 8, 1943 |
| 2,324,982 | Kuhn | June 20, 1943 |
| 2,380,153 | Davis | July 10, 1945 |
| 2,422,952 | Dakin | June 24, 1947 |
| 2,570,919 | Clifford | Oct. 9, 1951 |